United States Patent
Behzadi et al.

(10) Patent No.: US 11,385,332 B2
(45) Date of Patent: Jul. 12, 2022

(54) LIDAR SYSTEM WITH A MODE FIELD EXPANDER

(71) Applicant: Aeva, Inc., Mountain View, CA (US)

(72) Inventors: Behsan Behzadi, Sunnyvale, CA (US); Keith Gagne, Santa Clara, CA (US); Oguzhan Avci, Cupertino, CA (US); Omer P. Kocaoglu, Fremont, CA (US); Neal N. Oza, Palo Alto, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 556 days.

(21) Appl. No.: 16/359,217

(22) Filed: Mar. 20, 2019

(65) Prior Publication Data

US 2020/0300980 A1  Sep. 24, 2020

(51) Int. Cl.
*G01S 7/00* (2006.01)
*G01S 7/481* (2006.01)
*G01S 17/34* (2020.01)

(52) U.S. Cl.
CPC .......... *G01S 7/4817* (2013.01); *G01S 17/34* (2020.01)

(58) Field of Classification Search
USPC ....................................................... 356/5.01
See application file for complete search history.

(56) References Cited

U.S. PATENT DOCUMENTS

| | | | |
|---|---|---|---|
| 4,846,571 A | 7/1989 | Jelalian et al. | |
| 9,322,992 B2* | 4/2016 | Woodward | G02B 6/04 |
| 2005/0062955 A1* | 3/2005 | Deines | G01P 5/26 |
| | | | 356/28 |
| 2007/0058157 A1* | 3/2007 | Deines | G01P 3/44 |
| | | | 356/28 |
| 2009/0142066 A1* | 6/2009 | Leclair | G01S 7/4812 |
| | | | 398/139 |
| 2014/0209798 A1 | 7/2014 | Woodward et al. | |
| 2017/0214465 A1* | 7/2017 | Milione | H04B 10/516 |
| 2019/0025431 A1 | 1/2019 | Satyan et al. | |

FOREIGN PATENT DOCUMENTS

| | | | |
|---|---|---|---|
| EP | 1019773 | 7/2000 | |
| EP | 1019773 B1 * | 11/2004 | G01S 7/4812 |

OTHER PUBLICATIONS

Transmittal of the International Search Report and Written Opinion of the International Searching Authority dated Nov. 10, 2020, for PCT/US2020/020665, pp. 13.
Transmittal of International Preliminary Report on Patentability dated Nov. 10, 2020, for PCT/US2020/020665, pp. 13.

* cited by examiner

*Primary Examiner* — James R Hulka
(74) *Attorney, Agent, or Firm* — Womble Bond Dickinson (US) LLP

(57) ABSTRACT

A light detection and ranging (LIDAR) apparatus is provided that includes an optical source to emit an optical beam towards a target. The LIDAR apparatus further includes a mode field expander operatively coupled to the optical source to expand a mode area of the optical beam.

20 Claims, 6 Drawing Sheets

LIDAR SYSTEM WITH A MODE FIELD EXPANDER

TECHNICAL FIELD

The present disclosure relates generally to light detection and ranging (LIDAR) that provides range (and for some types a simultaneous measurement of velocity) across two dimensions.

BACKGROUND

Fast-scanning mirrors are the primary components used to illuminate a scene in most conventional LIDAR systems. One mirror typically scans quickly along the X direction (azimuth), while another mirror scans slowly along the Y direction (elevation). Light emission and detection from target reflections are done coaxially, typically via a single mode fiber. The collected light has a measured delay or an altered frequency signature that is used to extract range, and potentially velocity, information. A 3D point cloud can be established when the point-wise detected range information is combined with angular position feedback from the scanning mirrors.

To achieve higher frame rates, the mirror's angular velocity is increased, especially that of the scanner in faster scan direction (X scanner in our case). When using the mirrors with a high angular velocity and single-mode fiber-based detection, the target signal from distant objects is severely degraded. Signal degradation is mainly due to the difference in angular position of the scanner mirror from the launch time of the optical signal (pulsed or frequency swept) to the collection time of the same signal from a distant scattering target. This slight angular change causes a walk-off of the target signal at the fiber tip decreasing the coupling efficiency, which manifests itself as a weaker signal detection. Such degradation becomes more severe as the fiber diameter decreases, e.g. a single mode fiber with ~10 µm diameter, or as the mirror's angular velocity increases.

SUMMARY

The present disclosure includes, without limitation, the following example implementations.

Some example implementations provide a light detection and ranging (LIDAR) apparatus including an optical source to emit an optical beam towards a target and a mode field expander operatively coupled to the optical source to expand a mode area of the optical beam.

Some example implementations provide a method including generating, by an optical source of a light detection and ranging (LIDAR) system, an optical beam towards a target and converting, by a mode field expander operatively coupled to the optical source, a mode area associated with the optical beam.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1:
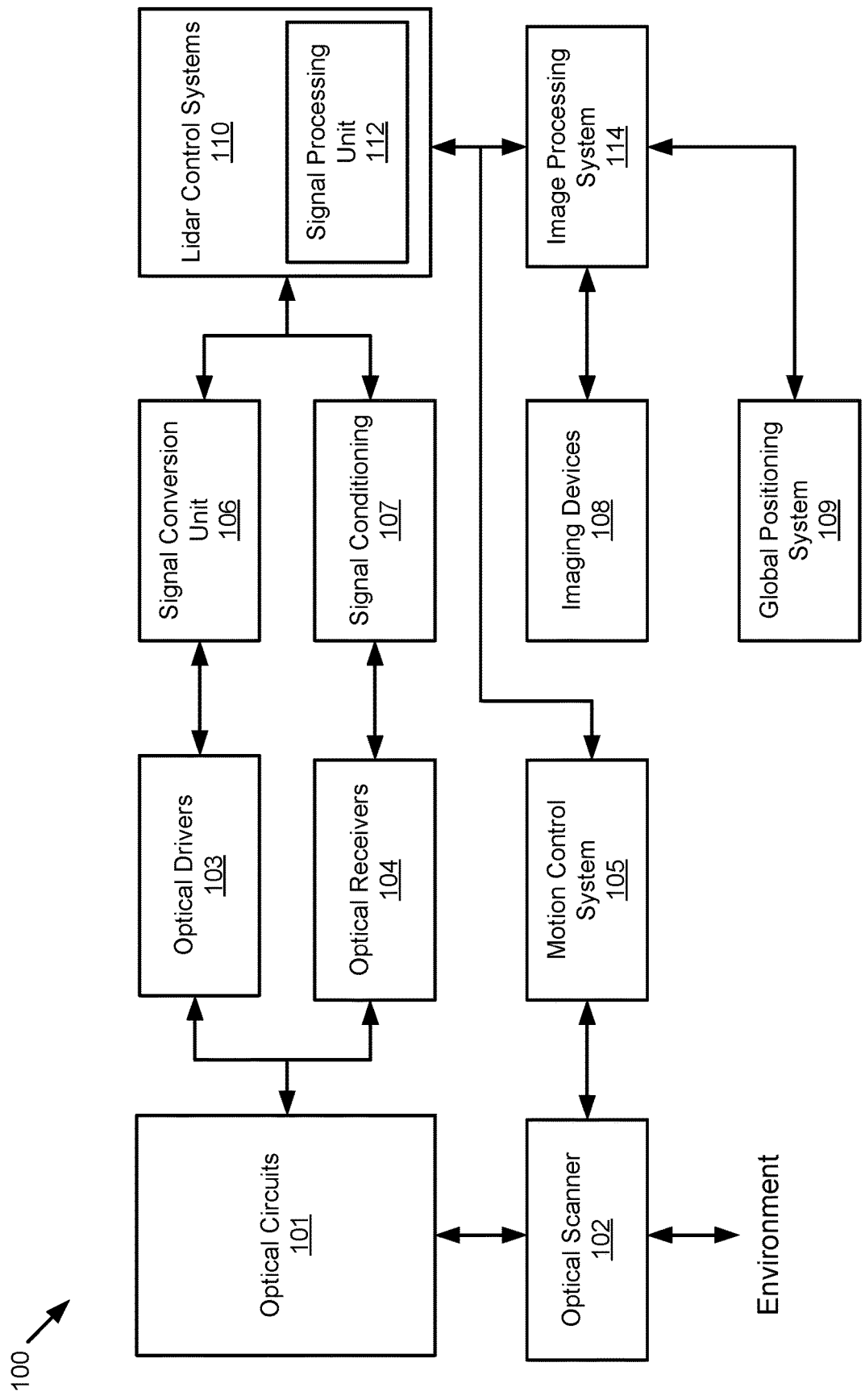
FIG. 1 illustrates a LIDAR system according to example implementations of the present disclosure.

Example implementations of the present disclosure are directed to an improved scanning LIDAR system. Example implementations of the present disclosure are based on a type of LIDAR that uses frequency modulation (FM) and coherent detection to overcome the shortcomings of traditional LIDAR systems and the limitations of prior FM LIDAR systems. Historically, FM LIDAR systems suffer from significant losses in the beam's return path; thus, such systems, which are often quite bulky, require a higher average beam output power to measure distances comparable to time-of-flight (TOF) LIDAR systems. However, the range is limited by the operating distance for eye-safe output powers.

Example implementations of the present disclosure are configured to simultaneously measure the range and velocity by scanning illumination beams over an environment and combining returning light (also referred to as "target signals" hereafter) with a local oscillator (LO) signal.

As described above, signal degradation resulting from the difference in angular position of the scanner mirror from the launch time of the optical signal to the collection time of the target signal (also referred to as "lag angle" hereafter) is worsened as the diameter of fiber or waveguides of an FM LIDAR system decrease. As the diameter decreases, the detected portion of mode area of the target signal also decreases. Furthermore, minimally reflective targets at a distance may be more difficult to detect by the FM LIDAR system as the diameter of the fiber or waveguides decrease because the mode area of incoming light is restricted by the diameter of the fiber/waveguides. Because the mode area of incoming light is larger than the single mode fiber/waveguides, the incoming light's chief ray is displaced off center with respect to the optical axis of the fiber tip. This displacement results in a reduced coupling efficiency of the incoming light (e.g., target signal) into the single-mode fiber/waveguide of the components of the LIDAR system. Accordingly, to compensate for these effects, it may be desirable to increase the diameter of the fiber/waveguides of the FM LIDAR system. For example, it may be desirable to use multi-mode fiber in an FM LIDAR system rather than a single-mode fiber, which has a smaller diameter than multi-mode fiber. However, conventional components of an FM LIDAR system are manufactured using single-mode fiber/waveguides, limiting the diameter of the fiber/waveguides of a conventional FM LIDAR system. Moreover, the highest spatial overlap (e.g., highest mixing efficiency) between the LO signal and target beam is achieved when the LO signal and target beam are mixed (e.g., combined) in a single mode fiber.

Example implementations of the present disclosure address the above and other deficiencies by an FM LIDAR system by converting the mode area of a target signal using a mode field expander. An optical source of the FM LIDAR system generates an optical beam towards a target via single-mode fiber. A mode field converter is operatively coupled to the optical source via a single-mode fiber/waveguide to receive the optical beam. The mode field expander increases the mode area of the optical beam as the optical beam passes through the mode field expander towards the target. The optical beam having the larger mode area travels to the target, where a portion of the optical beam is reflected back towards the FM LIDAR system by the target as a target signal.

The target signal is received by the larger mode area portion of the mode field expander. The mode field expander decreases the mode area of the target signal to correspond to the mode area of the single mode fiber/waveguide, increasing the coupling efficiency of the target signal and the single-mode fiber/waveguide and reducing losses in the target signal. The target signal is then combined with a LO signal and the combined signal is provided to photodetector for analysis.

Accordingly, by using a mode field expander to convert the mode area of the optical beam and target signal, the performance of the FM LIDAR system is improved. Because the mode field converter increases the mode area of the optical beam and receives a larger mode area of the target signal, the effects of signal degradation and aberrations on the combined signal are reduced. Furthermore, utilizing a mode field expander allows the use of conventional single-mode fiber/waveguide components in the FM LIDAR system while eliminating the reduced coupling efficiency of the target signal and the single-mode fiber/waveguide, improving the manufacturing capabilities and performance of the FM LIDAR system.

Although embodiments of the disclosure describe a mode field expander being utilized by a FM LIDAR system, aspects of the disclosure may be utilized by other types of LIDAR systems, such as time of flight (TOF) LIDAR systems.

FIG. 1 illustrates a LIDAR system 100 according to example implementations of the present disclosure. The LIDAR system 100 includes one or more of each of a number of components, but may include fewer or additional components than shown in FIG. 1. The LIDAR system 100 may be implemented in any sensing market, such as, but not limited to, transportation, manufacturing, metrology, medical, and security systems. For example, in the automotive industry, the described beam delivery system becomes the front-end of frequency modulated continuous-wave (FMCW) devices that can assist with spatial awareness for automated driver assist systems, or self-driving vehicles. As shown, the LIDAR system 100 includes optical circuits 101. The optical circuits 101 may include a combination of active optical components and passive optical components. Active optical components may generate, amplify, or detect optical signals and the like. In some examples, the active optical circuit includes optical beams at different wavelengths, one or more optical amplifiers, one or more optical detectors, or the like.

Passive optical circuits may include one or more optical fibers to carry optical signals, and route and manipulate optical signals to appropriate input/output ports of the active optical circuit. The passive optical circuits may also include one or more fiber components such as taps, wavelength division multiplexers, splitters/combiners, polarization beam splitters, collimators or the like. In some embodiments, as discussed further below, the passive optical circuits may include components to transform the polarization state and direct received polarized light to optical detectors using a PBS.

An optical scanner 102 may include one or more scanning mirrors that are rotatable along respective orthogonal axes to steer optical signals to scan an environment according to a scanning pattern. For instance, the scanning mirrors may be rotatable by one or more galvanometers. In some embodiments, other types of optical scanners may be used, such as acousto-optic, electro-optic, resonant or polygonal scanners. The optical scanner 102 collects light incident upon any objects in the environment into a return optical beam that is returned to the passive optical circuit component of the optical circuits 101. For example, the return optical beam may be directed to an optical detector by a polarization beam splitter or an optical circulator. In addition to the mirrors and galvanometers, the optical scanning system may include components such as a quarter-wave plate, lens, anti-reflective coated window or the like.

To control and support the optical circuits 101 and optical scanner 102, the LIDAR system 100 includes a LIDAR control systems 110. The LIDAR control systems 110 may include a processing device for the LIDAR system 100. In embodiments, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some embodiments, the LIDAR control systems 110 may include a signal processing unit 112 such as a digital signal processor. The LIDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as optical beams and amplifiers. In some embodiments, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some embodiments, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment. In some example implementations, the system points multiple modulated optical beams to the same target.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control subsystem. The optical circuits may also include a polarization wave plate to transform the polarization of the light as it leaves the optical circuits 101. In embodiments, the polarization wave plate may be a quarter-wave plate or a half-wave plate. A portion of the polarized light may also be reflected back to the optical circuits 101. For example lensing or collimating systems may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104. Configuration of optical circuits 101 for polarizing and directing beams to the optical receivers 104 are described further below.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometer (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
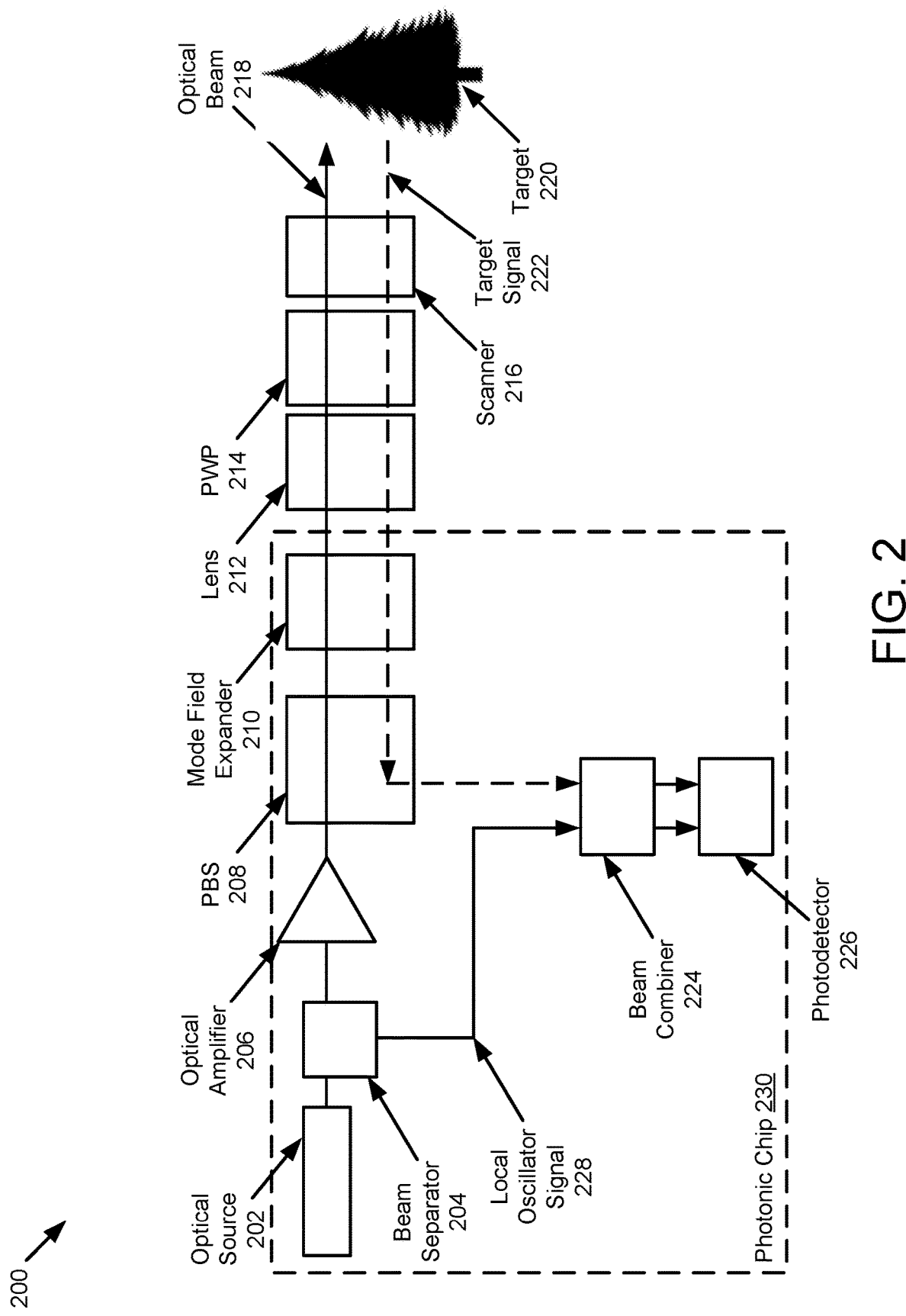
FIG. 2 illustrates aspects of a LIDAR system in accordance with embodiments of the present disclosure.

FIG. 2 illustrates aspects of a LIDAR system 200 in accordance with embodiments of the present disclosure. In embodiments, one or more components of LIDAR system 200 may be implemented in a photonic chip 230. As shown, an optical source 202 generates an optical beam 218. In some embodiments, multiple optical sources may be used to generate multiple optical beams. In embodiments, the multiple optical beams may have different wavelengths from one another. For example, a first optical source may generate a first optical beam having a first wavelength and a second optical source may generate a second optical beam having a second wavelength that is different than the first wavelength. The optical beam 218 is provided to a beam separator 204 that is operatively coupled to the optical source 202. The beam separator 204 separates a first portion of the optical beam 218 in a first direction towards a target and a second portion of the optical beam in a second direction as a local oscillator signal 228. In some embodiments, the beam separator 204 may be a 90/10 beam separator. In embodiments, the beam separator 204 may be a 50/50 beam separator.

The first portion of the optical beam 218 is provided to an optical amplifier 206 that is operatively coupled to the beam separator 204. The optical amplifier 206 amplifies light signals of the optical beam 218. The LIDAR system 200 may further include at least one optical device to route the optical beam 218 towards lens 212 and route the target signal 222 to the photodetector 226. As shown, the optical device(s) include a polarization beam splitter (PBS) 208 and a polarization wave plate (PWP) 214. Other examples of suitable optical device(s) may include an optical circulator or an optical splitter/combiner.

The optical beam 218 may pass through a polarization beam splitter (PBS) 208 that is operatively coupled to the optical amplifier 206 as non-polarized light. The optical beam 218 may enter into a mode field expander 210 that is operatively coupled to the PBS 208. The mode field expander 210 may convert the mode area of the optical beam 218 based on the direction the optical beam passes through the mode field expander 210. For example, when the optical beam 218 passes through the mode field expander 210 in a first direction, the mode field expander 210 may expand the mode area of the optical beam 218 and when the optical beam passes through the mode field expander 210 in the opposite direction, the mode field expander 210 may reduce the mode area of the optical beam 218. In embodiments, the mode field expander 210 may be an adiabatic mode expander. In some embodiments, the mode field expander 210 may be any component configured to convert the mode area of the optical beam 218. Referring to FIG. 2, as the optical beam 218 passes through the mode field expander 210 towards the target 220, the mode field expander 210 may expand the mode area of the optical beam 218. Aspects of the mode field expander 210 will be discussed in further detail at FIGS. 5A and 5B below.

The optical beam 218 may be provided to a lens 212 to focus/collimate the optical beam 218. The optical beam 218 may be provided to a polarization wave plate (PWP) 214 that transforms the polarization of the optical beam 218. For example, the polarization of the optical beam 218 may be transformed to a circular polarization. In some embodiments, an optical isolator may be utilized to transform the polarization of the optical beam 218 and/or redirect the optical beam 218 rather than a PWP and/or PBS.

Upon transforming the polarization of the light, the optical beam 218 may be transmitted towards a target 220 via a scanner 216 (e.g., optical scanner 102 of FIG. 1). When the optical beam 218 hits the target 220, a portion of the beam is returned back to the LIDAR system 200 as a target signal 222. The target signal 222 passes through the scanner 216, PWP 214 and lens 212, where the target signal is received by the mode field expander 210. Because the target signal 222 is moving in the opposite direction through the mode field expander 210 as the optical beam 218, the mode field expander 210 may reduce the mode area of the target signal 222. In embodiments, the mode field expander 210 may reduce the mode area of the target signal 222 to correspond to the mode area of a single-mode fiber/waveguide.

After passing through the mode field expander 210, the target signal 222 is received by PBS 208. Because the polarization of the target signal 222 is transformed by PWP 214, the target signal 222 is reflected by PBS 208 rather than passing through PBS 208. The target signal 222 is reflected by PBS 208 towards a beam combiner 224. The beam combiner 224 receives the target signal 222 and the local oscillator signal 228 and produces a combined signal that includes both the target signal 222 and the local oscillator signal 228. In embodiments, the beam combiner 224 may be a 50/50 or 90/10 beam combiner. The combined signal is then received by a photodetector 226 for subsequent analysis, as previously described.

Figure 3:
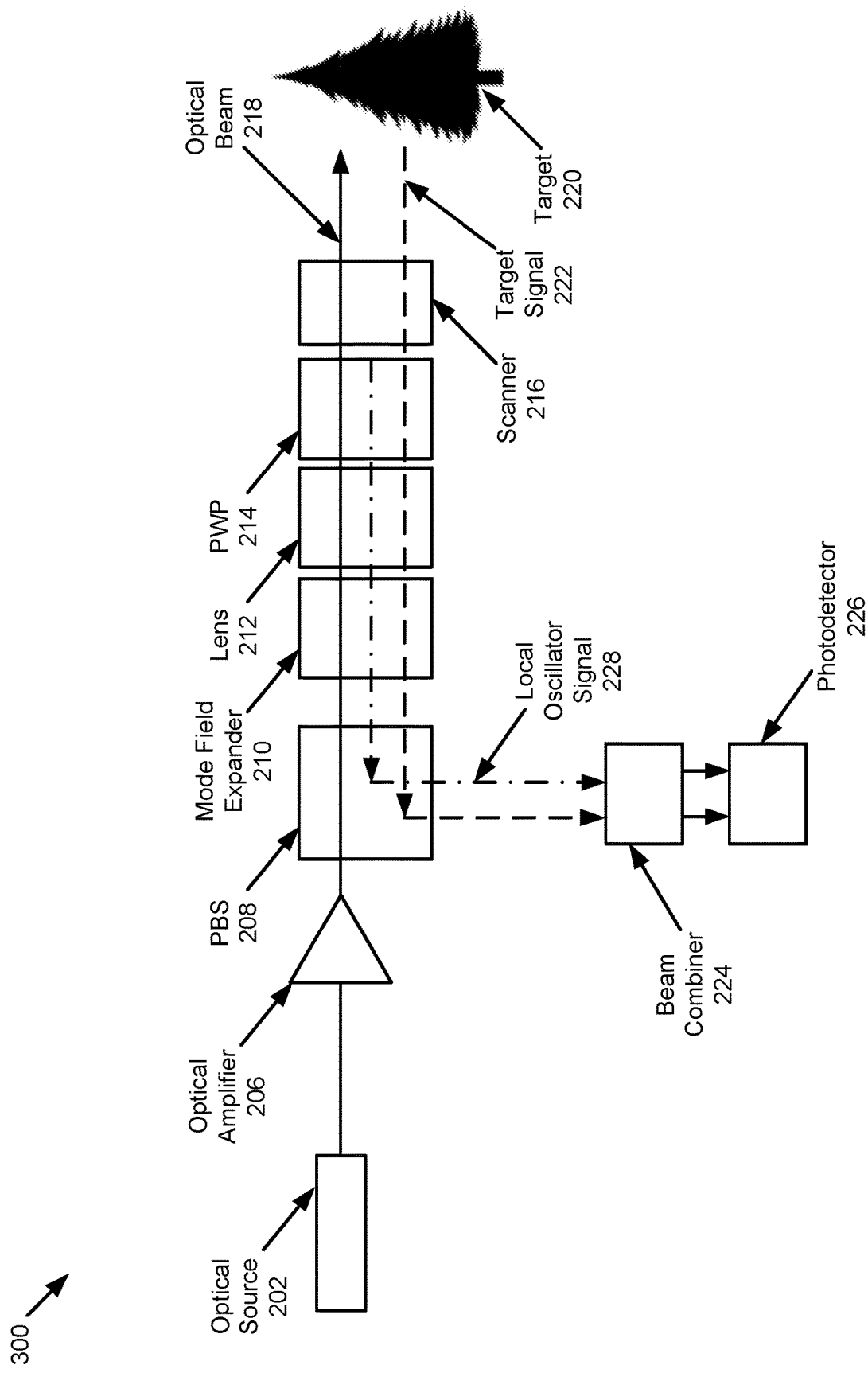
FIG. 3 illustrates aspects of a LIDAR system in accordance with other embodiments of the present disclosure.

FIG. 3 illustrates aspects of a LIDAR system 300 in accordance with other embodiments of the present disclosure. The components of LIDAR system 300 may be similar to the components of LIDAR system 200. However, rather than utilizing a beam separator (e.g., beam separator 204) to produce a local oscillator signal 228, the local oscillator signal 228 may be reproduced by a reflective surface of PWP 214. For example, PWP 214 may reflect a portion of the optical beam in a direction towards optical source 202. In some embodiments, a separate mirror, micro-lens array, filter or reflective coating on PWP 214 may be used. The reflected portion of the optical beam becomes the local oscillator signal 228 for interference with the returned target signal 222.

Similar to the target signal 222 in FIG. 2, because the polarization of the local oscillator signal 228 has been transformed, PBS 208 reflects the local oscillator signal 228 in a direction towards beam combiner 224 rather than allowing the local oscillator signal 228 to pass through PBS 208.

Figure 4:
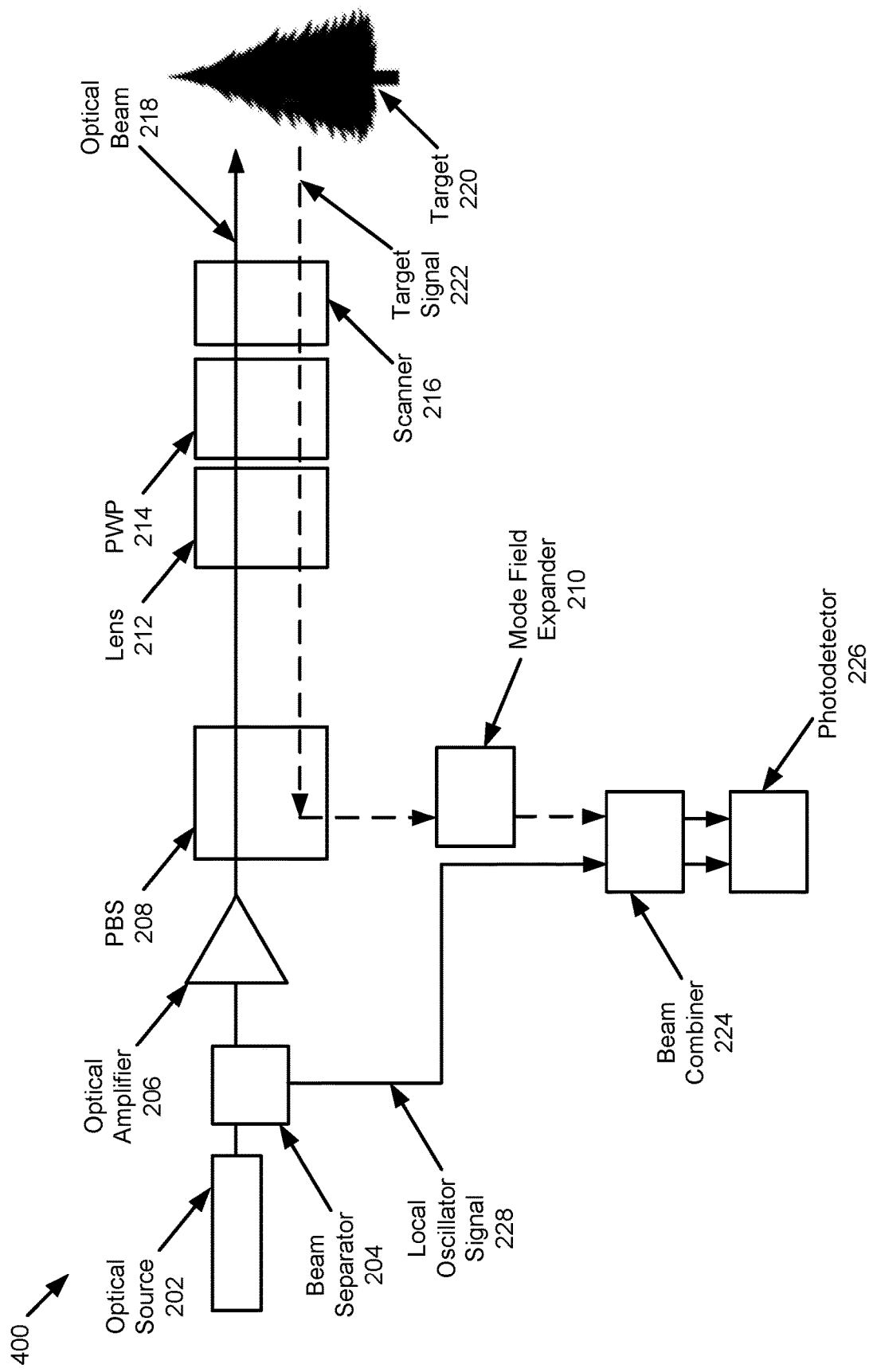
FIG. 4 illustrates aspects of a LIDAR system in accordance with some embodiments of the present disclosure.

FIG. 4 illustrates aspects of a LIDAR system 400 in accordance with some embodiments of the present disclosure. The components of LIDAR system 400 may be similar to the components of LIDAR system 200. However, rather than having the mode field expander 210 in the path of the optical beam 218 and the target signal 222, the mode field adapter 210 is placed in the path of the target signal 222 after the target signal 222 has been directed by PBS 208 towards photodetector 226.

As the target signal 222 passes through the mode field expander 210, the mode field expander 210 expands the mode area of the target signal 222. The target signal 222 is provided to a beam combiner 224, where the target signal 222 having the expanded mode area is combined with local oscillator signal 228. The combined signal is then provided to photodetector 226 for subsequent analysis.

Figure 5A:
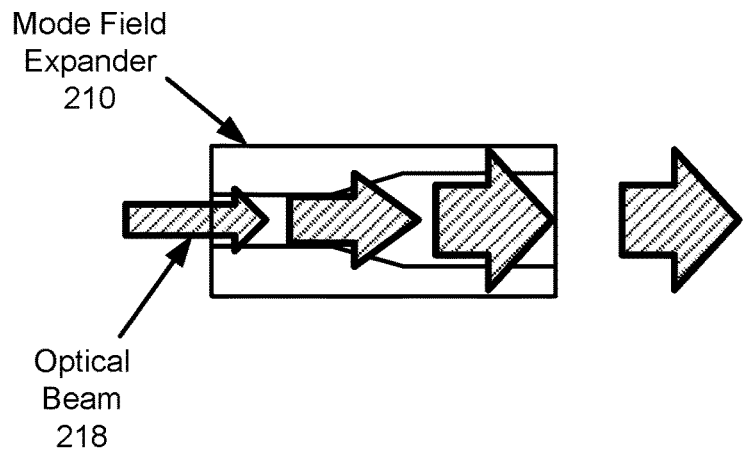
FIG. 5A is an illustration of an example of a mode field expander expanding a mode area of an outgoing optical beam in accordance with embodiments of the disclosure.

FIG. 5A is an illustration 500 of an example of a mode field expander expanding a mode area of an outgoing optical beam in accordance with embodiments of the disclosure.

Referring to FIG. 5A, as an optical beam 218 passes through the mode field expander 210, the mode area of the optical beam 218 is converted to the fundamental mode of a larger mode area fiber/waveguide. In embodiments, the mode field expander 210 may be an adiabatic mode expander (AME). The conversion of the mode area preserves the low loss single-mode properties of the optical beam 218.

Figure 5B:
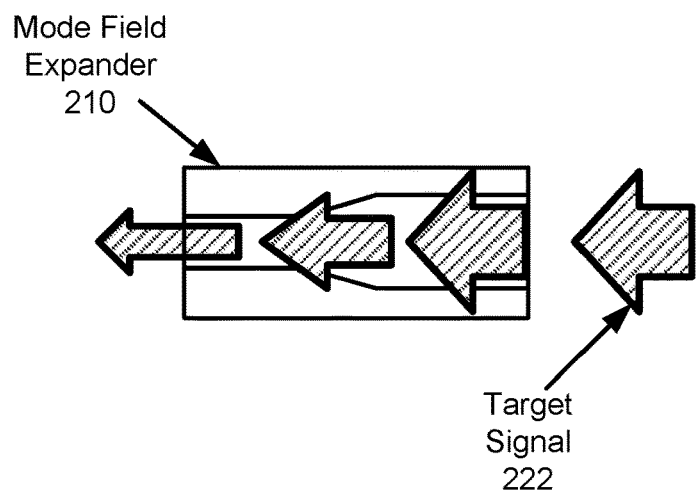
FIG. 5B is an illustration of an example of a mode field expander reducing a mode area of an incoming target signal in accordance with embodiments of the disclosure.

FIG. 5B is an illustration 550 of an example of a mode field expander reducing a mode area of an incoming target signal in accordance with embodiments of the disclosure.

Referring to FIG. 5B, as a target signal 222 passes through the mode field expander 210, the mode area of the target signal 222 is reduced to the mode area of the single-mode fiber/waveguides of LIDAR system components. Reducing the mode area of the target signal 222 to the mode area of the single-mode fiber/waveguides increases the coupling efficiency of the target signal 222 and the single-mode fiber/waveguides while providing a low loss of the target signal 222.

Figure 6:
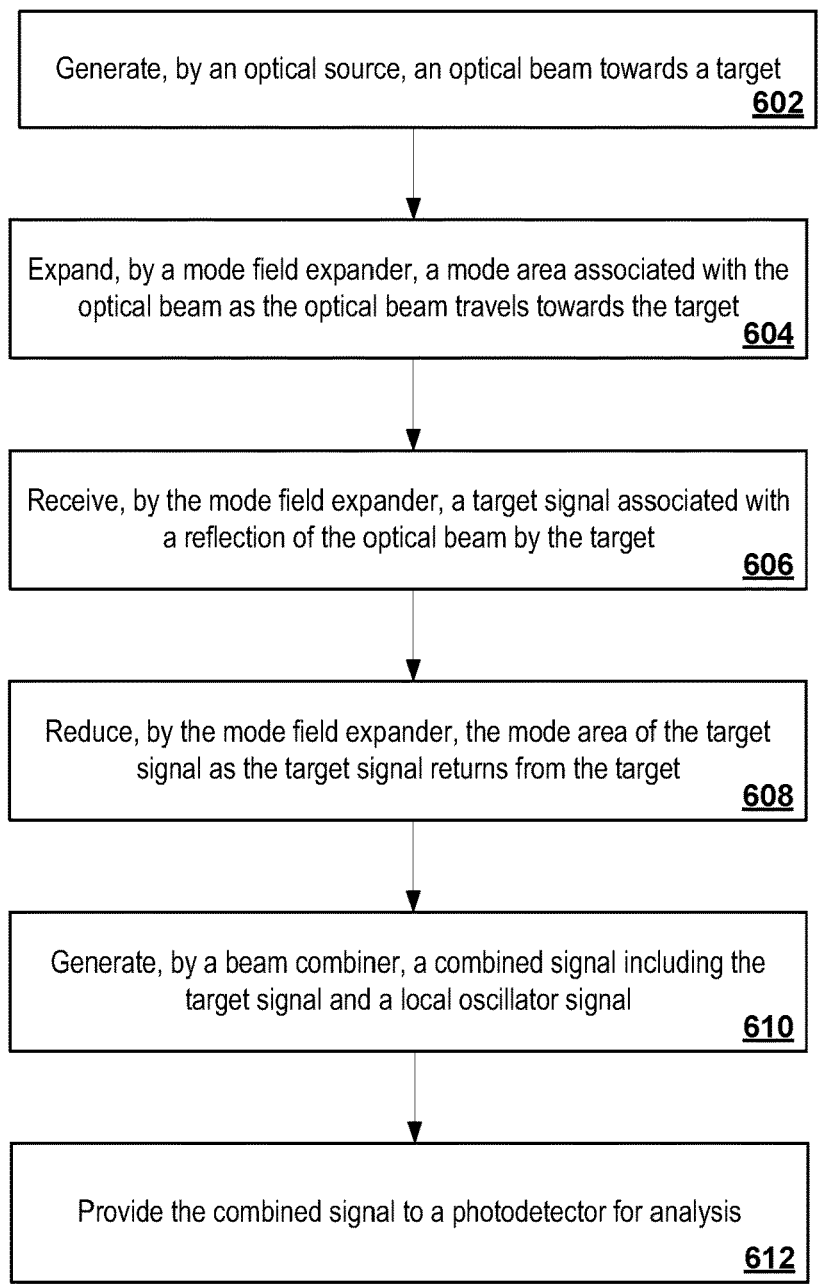
FIG. 6 depicts a flow diagram of a method for utilizing a mode field expander to convert the mode area of incoming and outgoing light of a LIDAR system in accordance with implementations of the present disclosure.

FIG. 6 depicts a flow diagram of a method 600 for utilizing a mode field expander to convert the mode area of incoming and outgoing light of a LIDAR system in accordance with implementations of the present disclosure. In embodiments, various portions of method 600 may be performed by LIDAR systems 100, 200, 300 and/or 400 of FIGS. 1, 2, 3 and 4 respectively.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

At block 602, an optical source generates an optical beam towards a target. At block 604, a mode field expander expands a mode area associated with the optical beam as the optical beam travels towards the target. For example, the mode field expander may expand the mode area of the optical beam to a fundamental mode of a large mode area waveguide/fiber. At block 606, the mode field expander receives a target signal associated with a reflection of the optical beam by the target. The reflected target signal may be captured using the large mode area portion of the mode field expander.

At block 608, the mode field expander reduces the mode area of the target signal as the target signal returns from the target. In embodiments, the mode field expander may reduce the mode area of the target signal to correspond to the mode area of the single-mode fiber/waveguide components of the LIDAR system. At block 610, a beam combiner generates a combined signal including the target signal and a local oscillator signal. For some embodiments, such as the embodiment described at FIG. 3, the local oscillator signal and target signal may be combined by lensing optics of the LIDAR system. Accordingly, in such embodiments, block 610 may not be performed. At block 612, the combined signal is provided to a photodetector for analysis.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A frequency modulated continuous-wave (FMCW) light detection and ranging (LIDAR) apparatus, comprising:
   an optical source to emit an optical beam towards a target; and
   a mode field expander operatively coupled to the optical source to:
   expand a mode area of the optical beam from a first mode area to a second mode area corresponding to a larger fiber, during transmission towards the target through the mode field expander, to an optical lens, and to a scanner; and
   reduce the mode area of the optical beam to the first mode area, upon receipt from scanner, to the optical lens, through the mode field expander, and to a beam combiner.

2. The FMCW LIDAR apparatus of claim 1, further comprising:
   a first beam separator operatively coupled between the optical source and the mode field expander, the first beam separator to separate a first portion of the optical beam in a first direction towards the target and a second portion of the optical beam in a second direction as a local oscillator signal.

3. The FMCW LIDAR apparatus of claim 2, further comprising:
   a beam combiner to generate a combined signal comprising the local oscillator signal and a target signal associated with the optical beam.

4. The FMCW LIDAR apparatus of claim 3, further comprising:
   a photodetector operatively coupled to the beam combiner to receive the combined signal from the beam combiner.

5. The FMCW LIDAR apparatus of claim 3, wherein the mode field expander is operatively coupled between at least one optical device and the beam combiner, wherein the mode field expander receives the target signal from the at least one optical device, expands the mode area of the target signal and provides the target signal to the beam combiner.

6. The FMCW LIDAR apparatus of claim 1, further comprising:
a polarization beam splitter operatively coupled between the optical source and the mode field expander, the polarization beam splitter to pass a first polarization state of light through the polarization beam splitter in a first direction and reflect a second polarization state of light in a second direction different than the first direction.

7. The FMCW LIDAR apparatus of claim 1, further comprising:
a polarization wave plate to transform a polarization of the optical beam.

8. The FMCW LIDAR apparatus of claim 7, wherein the polarization wave plate further comprises a reflector or a coating to return a second portion of the optical beam as a local oscillator signal.

9. The FMCW LIDAR apparatus of claim 1, further comprising:
a second optical source to emit a second optical beam towards the target, wherein a first wavelength of the optical beam is different than a second wavelength of the second optical beam.

10. The FMCW LIDAR apparatus of claim 1, further comprising:
an optical amplifier operatively coupled between the optical source and the mode field expander, the optical amplifier to amplify the optical beam.

11. The FMCW LIDAR apparatus of claim 1, wherein the at least one of the optical source or the mode field expander are implemented in a photonic chip.

12. A method comprising:
generating, by an optical source of a frequency modulated continuous-wave (FMCW) light detection and ranging (LIDAR) system, an optical beam towards a target; and
converting, by a mode field expander operatively coupled to the optical source, a mode area associated with the optical beam to expand the mode area from a first mode area to a second mode area corresponding to a larger fiber during transmission towards the target through the mode field expander, to an optical lens, and to a scanner, and to reduce the mode area of the optical beam to the first mode area, upon receipt from scanner, to the optical lens, through the mode field expander, and to a beam combiner.

13. The method of claim 12, further comprising:
receiving, by a beam separator operatively coupled between the optical source and the mode field expander, the optical beam; and
separating, by the first beam separator, a first portion of the optical beam in a first direction towards the target and a second portion of the optical beam in a second direction as a local oscillator signal.

14. The method of claim 13, further comprising:
receiving, by a beam combiner, a target signal associated with the optical beam and the local oscillator signal; and
generating, by the beam combiner, a combined signal comprising the target signal and the local oscillator signal.

15. The method of claim 14, further comprising:
receiving, by a photodetector, the combined signal from the second beam separator.

16. The method of claim 12, further comprising:
transforming, by a polarization wave plate, a polarization of the optical beam.

17. The method of claim 12, further comprising:
generating, by a second optical source of the FMCW LIDAR system, a second optical beam towards the target, wherein the second optical beam has a different wavelength than the optical beam; and
converting, by the mode field expander, a second mode area associated with the second optical beam.

18. The method of claim 12, wherein the mode field expander comprises an adiabatic mode expander.

19. The method of claim 12, further comprising:
receiving, by the mode field expander, a target signal associated with the optical beam; and
converting a second mode area associated with the target signal.

20. The method of claim 12, further comprising:
amplifying, by an optical amplifier operatively coupled between the optical source and the mode field expander, the optical beam generated by the optical source.

* * * * *